(12) United States Patent
Pauker et al.

(10) Patent No.: US 7,412,059 B1
(45) Date of Patent: Aug. 12, 2008

(54) PUBLIC-KEY ENCRYPTION SYSTEM

(75) Inventors: Matthew J Pauker, Menlo Park, CA (US); Rishi R Kacker, Menlo Park, CA (US); Guido Appenzeller, Menlo Park, CA (US)

(73) Assignee: Voltage Security, Inc., Palo Alto, CA (US)

( * ) Notice: Subject to any disclaimer, the term of this patent is extended or adjusted under 35 U.S.C. 154(b) by 691 days.

(21) Appl. No.: 10/307,007

(22) Filed: Nov. 27, 2002

(51) Int. Cl.
*H04L 9/00* (2006.01)

(52) U.S. Cl. .......................................... 380/277; 726/1
(58) Field of Classification Search ..................... 726/1; 380/277

See application file for complete search history.

(56) References Cited

U.S. PATENT DOCUMENTS

| | | | |
|---|---|---|---|
| 5,016,276 | A | 5/1991 | Matumoto et al. |
| 5,159,632 | A | 10/1992 | Crandall |
| 5,271,061 | A | 12/1993 | Crandall |
| 5,272,755 | A | 12/1993 | Miyaji et al. |
| 5,581,616 | A | 12/1996 | Crandall |
| 5,715,403 | A | 2/1998 | Stefik et al. |
| 5,968,177 | A * | 10/1999 | Batten-Carew et al. ........ 726/4 |
| 6,061,448 | A | 5/2000 | Smith et al. |
| 6,236,971 | B1 | 5/2001 | Stefik et al. |
| 6,385,596 | B1 | 5/2002 | Wiser et al. |
| 6,658,415 | B1 | 12/2003 | Brown et al. |
| 6,775,382 | B1 * | 8/2004 | Al-Salqan ................... 380/286 |
| 6,859,533 | B1 * | 2/2005 | Wang et al. ................... 380/28 |
| 2002/0042876 | A1 * | 4/2002 | Smith ........................... 713/153 |
| 2002/0076042 | A1 | 6/2002 | Sandhu et al. |
| 2002/0147917 | A1 * | 10/2002 | Brickell ........................ 713/193 |
| 2003/0081785 | A1 | 5/2003 | Bonch et al. |
| 2003/0182573 | A1 | 9/2003 | Toneguzzo et al. |

OTHER PUBLICATIONS

Atkins et al., "PGP Message Exchange Formats," Informational Request for Comments (Aug. 1996).
Boneh et al., "Identity-Based Encryption from the Weil Pairing," from *Crypto '2001* (Oct. 2002).
Cocks, Clifford, "An Identity Based Encryption Scheme based on Quadratic Residues." (2001).
Horwitz et al., "Toward Hierarchical Identity-Based Encryption," *Proceedings of EUROCRYPT* 2002, (Apr. 28-May 2, 2002) Lecture-Notes in Computer Science, Stanford University.

(Continued)

*Primary Examiner*—Nasser Moazzami
*Assistant Examiner*—Brandon S Hoffman
(74) *Attorney, Agent, or Firm*—Treyz Law Group; G. Victor Treyz

(57) ABSTRACT

A system is provided that allows users to communicate securely. A key management service may generate a single public-key/private-key pair. A sender who desires to send a secure message to a receiver may encrypt the message using a message key. The sender may use the public key to encrypt the message key and policy information that dictates how the message may be accessed. The receiver may pass the public-key-encrypted message key and policy information to the key management service. The key management service decrypts this information using the private key. After the key management service uses the policy information to verify that the receiver is authorized to access the message, the key management service may provide the decrypted message key to the receiver. The receiver may use this unencrypted version of the message key to decrypt the message-key-encrypted message from the sender.

22 Claims, 4 Drawing Sheets

OTHER PUBLICATIONS

Housley et al., "Internet X.509 Public Key Infrastructure Certificate and CRL Profile," Standards Track Request for Comments (Jan. 1999).

Lai et al., "A Proposal for a New Block Encryption Standard," *Advances in Cryptology: EUROCRYPT 1990 Proceedings*, Springer Verlag: pp. 389-404 (1991).

Rivest et al., "A Method for Obtaining Digital Signatures and Public-Key Cryptosystems," from *The Communications of the ACM* (Feb. 1978).

Mont et al., "The HP Time Vault Service: Innovating the way confidential information is disclosed, at the right time" http://www.hpl.hp.com/techreports/2002/HPL-2002-243.html (2002).

Chandramouli, Ramaswamy, "Application of XML Tools for Enterprise-Wide RBAC Implementation Tasks", National Institute on Standards and Technology, pp. 11-18, ISBN: 1-58113-259-x/00/07.

* cited by examiner

PUBLIC-KEY ENCRYPTION SYSTEM

BACKGROUND OF THE INVENTION

This invention relates to encryption, and more particularly, to public key encryption schemes.

Cryptographic systems are used to provide secure communications services such as secure email services and secure web browsing.

With symmetric key cryptographic systems, the sender of a message uses the same key to encrypt the message that the receiver of the message uses to decrypt the message. Symmetric-key systems require that each sender and receiver exchange a shared key in a secure manner.

With public-key cryptographic systems, two types of keys are used—public keys and private keys. Senders may encrypt messages using the public keys of the receivers. Each receiver has a private key that is used to decrypt the messages for that receiver.

One public cryptographic system that is in use is the RSA cryptographic system. Each user in this system has a unique public key and a unique private key. The private key and public key of each user are generated locally at the user. The private key is retained for subsequent use by the user in decrypting received messages. The public key is published for use by senders in encrypting messages.

A sender using the system may obtain the public key of a given receiver from a key server connected to the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message.

To allow an organization to revoke the secure email privileges of an employee when the employee no longer works for the organization, some organizations may arrange to have the public keys of all of their employees automatically expire at the end of each day. New public keys for the current employees may be generated each day. The new public keys may be made publicly available by placing them on a public key server.

Because encryption using public-key encryption algorithms is computationally intensive, some systems allow users to use public-key encryption to securely exchange a shared symmetric key. The symmetric key may then be used to support a secure communication session.

With typical public key encryption systems, a sender must obtain the unique public key of each message recipient before the sender can encrypt a message for that recipient. Because each receiver has a unique public key, a system with N users requires N public keys. In an environment in which there are millions of users, public key servers must host information on these millions of public keys. When a sender desires to send a message, the sender will often not have the public key needed to encrypt the message for a particular given receiver, so the sender must go on-line to access the key server and thereby locate the correct public key information from among the many other entries in the public key directory. Pushing the public key information out to users on a periodic basis to avoid reliance on this on-line look-up process may be cumbersome or impractical due to the large numbers of public keys involved.

SUMMARY OF THE INVENTION

In accordance with the present invention, a public-key encryption system is provided that allows users to communicate securely over communications networks such as the Internet. With the system, it is not necessary for each receiver to have a unique public key. A sender desiring to send secure messages to various receivers need not know each receiver's public key information prior to sending the messages, which helps to overcome the difficulties associated with continually pushing large amount of public key information out to senders or requiring that senders always be on-line to obtain public key information.

A sender may encrypt a message to be sent to a receiver using a message key. For example, the sender may encrypt a message using a symmetric encryption key.

A key management service may be used to generate a single public key and a single corresponding private key. The sender may use the public key generated by the key management service to encrypt the message key and corresponding policy information that dictates who may access the message contents of the message. The policy information may, for example, limit access to the contents of the message to a particular receiver. If desired, the policy information may include date-based constraints that may restrict access to the message to a particular time (e.g., before and/or after certain dates) or that may restrict access to only those receivers that have certain access rights or permissions (e.g., receivers having a particular clearance level).

The sender may send the message-key-encrypted message and the public-key-encrypted message-key/policy-information to the receiver. When the receiver desires to access the message, the receiver may pass the public-key-encrypted message key and the public-key-encrypted policy information to the key management service. The key management service may use the private key to decrypt this information. The key management service may then use the policy information to determine whether the receiver is authorized to access the message. For example, the key management service may compare authentication information provided by the receiver to receiver identity information specified in the policy information to determine whether the receiver is allowed to open the message. If the receiver is authorized to access the message, the key management service may send the decrypted message key to the receiver for the receiver to use in decrypting the message-key-encrypted message.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
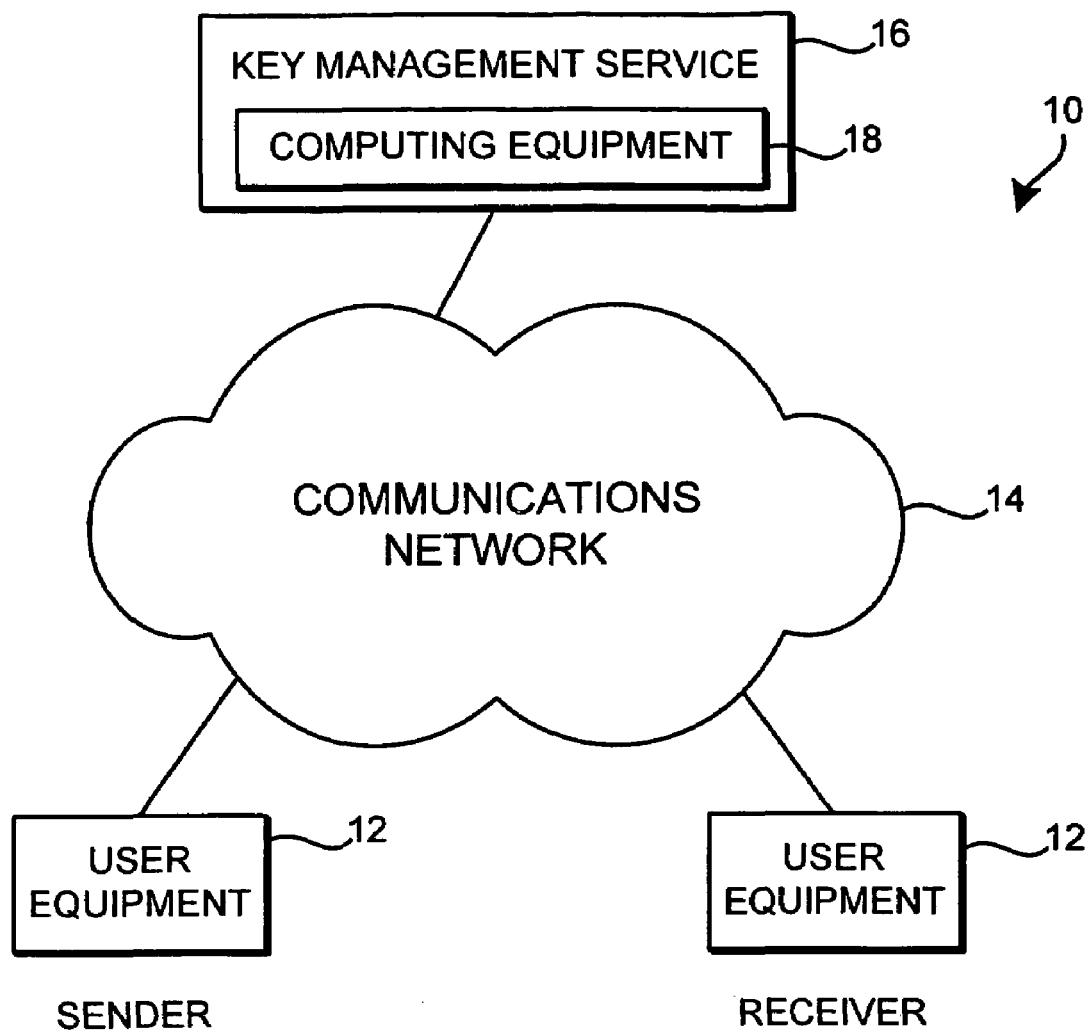
FIG. 1 is a diagram of an illustrative encryption system in accordance with the present invention.

An illustrative system 10 in accordance with the present invention is shown in FIG. 1. System 10 allows users at various locations to communicate securely. The users in the system may be individuals, organizations, or any other suitable parties or entities. Users may communicate with each other using user equipment devices 12. Equipment 12 may, for example, include computing equipment such as a personal computers, portable computers, mainframe computers, networked computers or terminals, telecommunications equipment, handheld computers or personal digital assistants, or cellular telephones. Multiple users may use the same device. For example, a group of users may share the use of a single computer terminal that is connected to a host computer in a local area network. These are merely illustrative examples of the type of platforms that the users of system 10 may use. User equipment 12 may be based on any suitable electronic equipment if desired.

The user equipment devices may be interconnected by a communications network 14. Network 14 may be, for example, the Internet, a local area network, a wide area network, the public switched telephone network, a virtual private network, a wired network, a wireless network, dedicated leased lines, a network based on fiber-optic or cable paths or other wired or wireless paths, or a network formed using any other suitable network technology or a combination of such networks.

Computing equipment 18 at key management service 16 (e.g., computing equipment such as a server) may be used to provide key management services. Users at user equipment 12 may communicate with key management service 16 over communications network 14.

Key management service 16 may be used to generate a single public key and a single corresponding private key. The RSA algorithm or other suitable public key encryption algorithm may be used to generate the public/private key pair. More keys may be generated and more than one service 16 may be operated if desired, but the present discussion will focus on the use of key management service 16 in generating one public-key/private-key pair for clarity. Moreover, although key management service 16 is depicted as a stand-alone service in FIG. 1, the functions of key management service 16 may be provided using computer equipment that also serves other functions (e.g., the services of a certificate authority, the services of a network administrator, the services of an Internet service provider, the services of an email server, etc.). The computing equipment 18 that is used to support the functions of the key management service may be based on any suitable computing platform, such as a mainframe computer, a server or collection of servers, a workstation, distributed computers in a network, telecommunications equipment, etc.

The users in system 10 can communicate securely by sending each other messages that include text, graphics, video, audio, commands, executable code, web links, or any other suitable content.

Some user activities, such as sending person-to-person email messages in system 10, require manual intervention. For example, a person who desires to send such a message must compose the message before it is encrypted and sent to the appropriate recipient.

Other user activities in system 10 may be automated or semiautomated. These user activities may take place with little or no manual intervention. As just one example, the user at one device 12 may be a banking institution that desires to use encrypted communications to deliver encrypted bank statements to account holders at other devices 12 over communications networks 14. The distribution process may be automated so that no operator intervention will generally be needed at the banking institution's equipment once the system has been properly set up. User receipt of the statements may also be automated.

Figure 2:
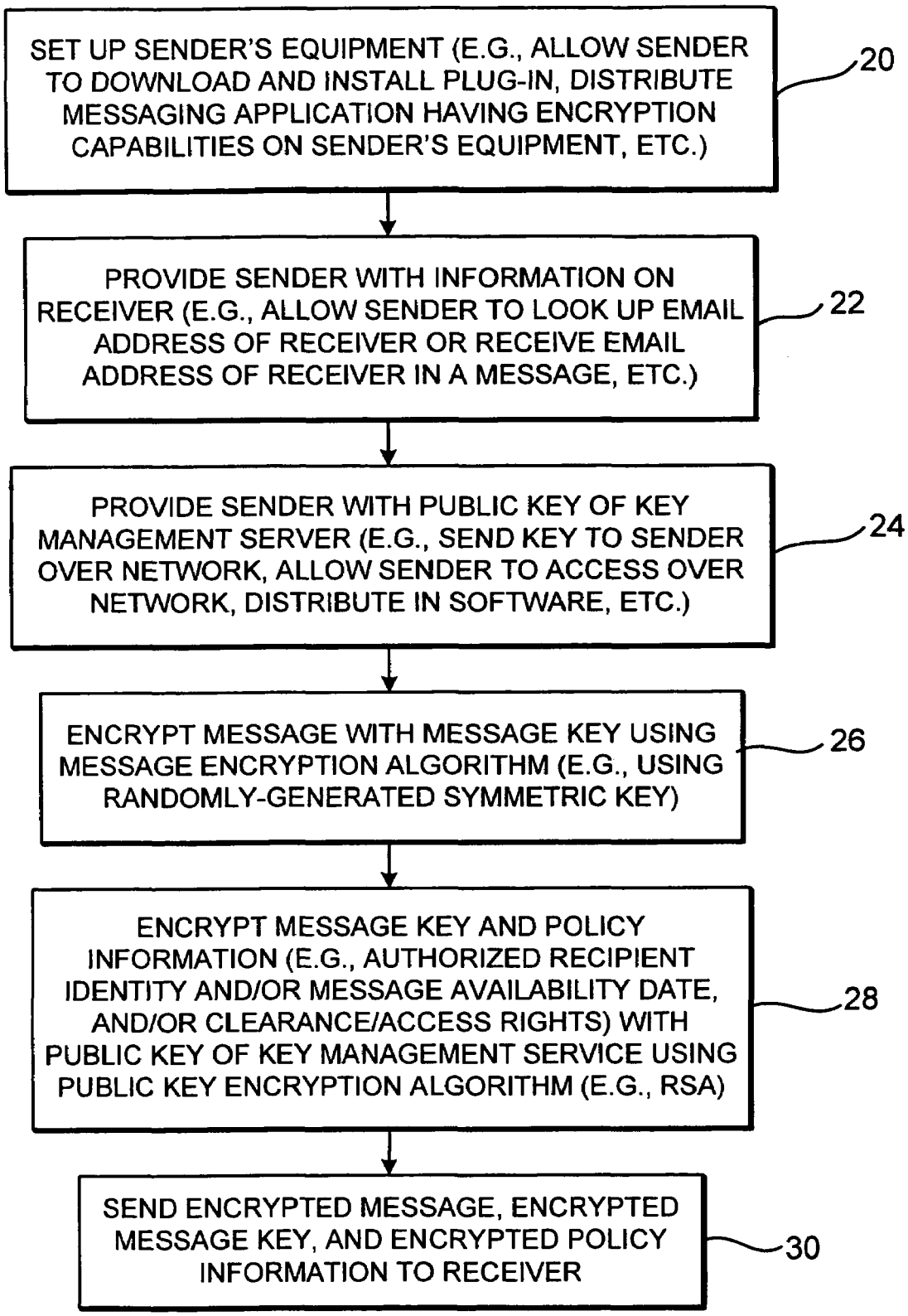
FIG. 2 is a flow chart of illustrative steps involved in sending an encrypted message using the system of FIG. 1 in accordance with the present invention.
Figure 3:
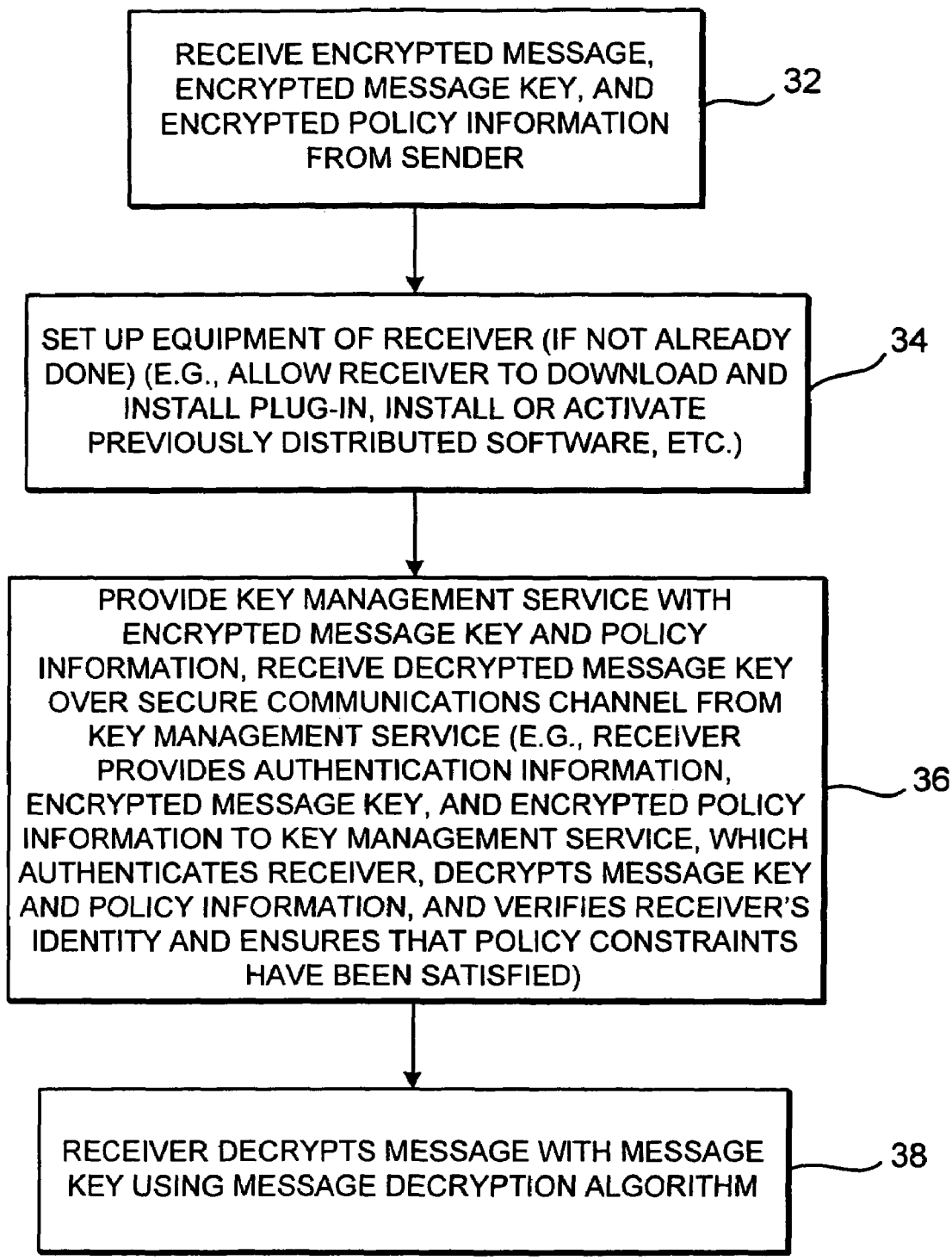
FIG. 3 is a flow chart of illustrative steps involved in receiving an encrypted message using the system of FIG. 1 in accordance with the present invention.
Figure 4:
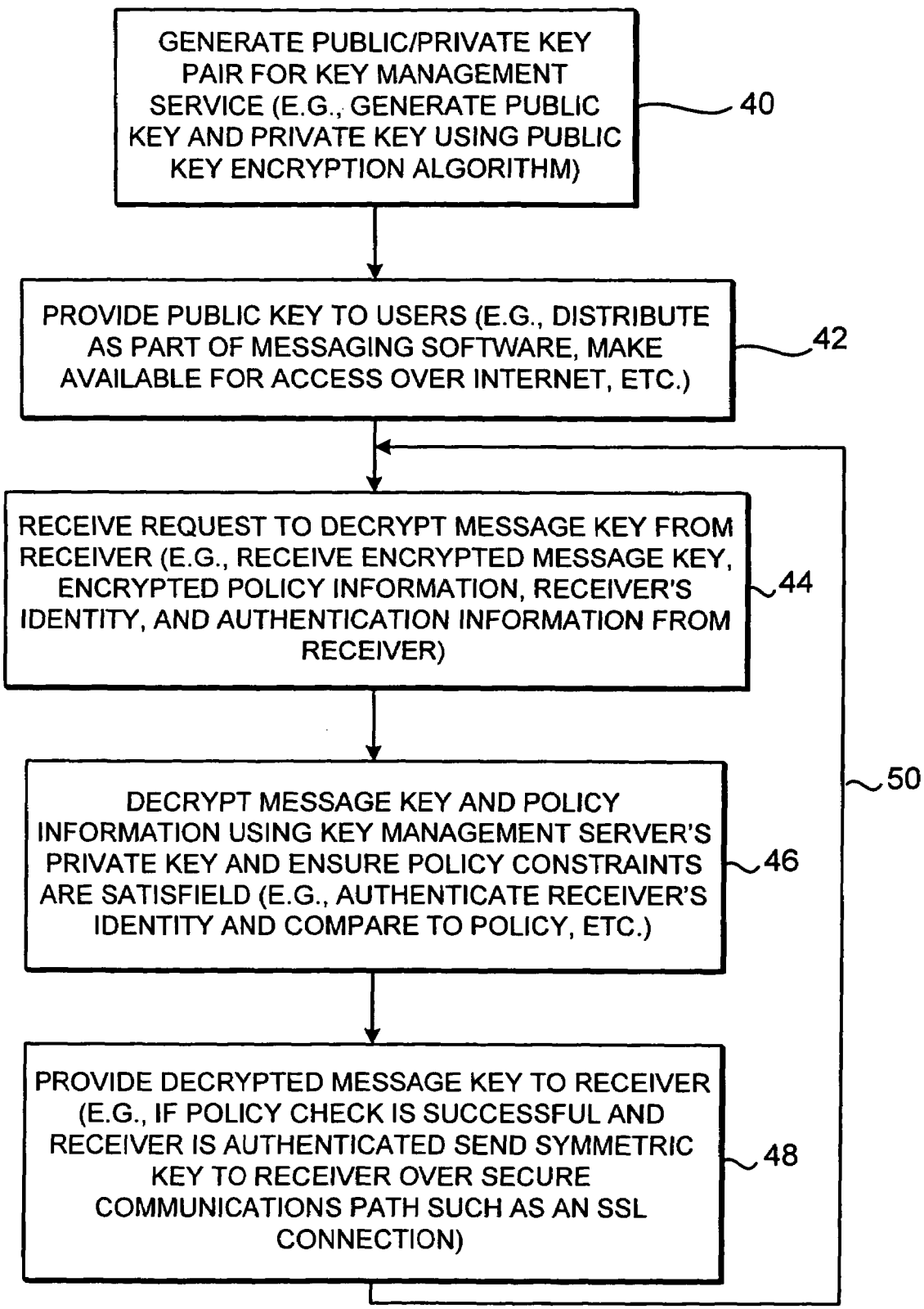
FIG. 4 is a flow chart of illustrative steps involved in using a key management service to support operation of the system of FIG. 1 in accordance with the present invention.

Steps involved in using the equipment of FIG. 1 to send a secure message from a sender at one device 12 to a receiver at another device 12 are shown in FIGS. 2, 3, and 4. In FIG. 2, the operation of the system is shown from the perspective of the sender's equipment. The steps of FIG. 3 are described from the perspective of the receiver. Details of the system's operation from the perspective of the key management service are shown in FIG. 4.

Steps involved in setting up and using the equipment of a sender to send secure (encrypted) messages to a receiver are shown in FIG. 2. At step 20, a sender's equipment 12 may be set up (e.g., appropriate stand-alone or plug-in software may be downloaded onto equipment 12 over network 12 or software that has been distributed on the sender's equipment or otherwise has been installed may be activated or run). The software for the sender's equipment may include, for example, a messaging application such as an email application for composing and sending email messages. The single public key produced by key management service 16 may be included in the software or may be obtained by the software during an initialization process or at the time a message is sent (see step 24).

At step 22, the sender may be provided with information on the receiver. For example, the sender may obtain the receiver's email address (e.g., electronically in a message or by browsing a web site or directory, over the phone, from a written document, from previously-stored information on the sender's equipment, etc.). If desired, the sender may be provided with policy information regarding the receiver at step 22 (e.g., the receiver's security clearance level). This information may be used during the encryption process of step 28.

At step 24, the sender may be provided with the public key associated with the key management service 16. This single public key may be used in sending messages to many different users in system 14. The public key of the key management service 16 may be distributed to the sender over communications network 14 (e.g., this information may be transmitted to the sender in an email or other message), the sender may access a database at the key management service to obtain the public key, the public key may be embedded in the original version of the sender's email application or other sender software, the public key may be provided as part of a stand-alone program or plug-in that is downloaded from the key management service 16 over network 14, etc. The public key may be generated by key management service 16 with a corresponding private key. This public-key/private-key pair may be generated using any suitable public key encryption algorithm such as the RSA public key encryption algorithm.

At step 26, the sender's equipment may be used to generate a message key (if not already generated). For example, the sender's equipment may be used to generate a symmetric message key (for use with an algorithm using a symmetric key encryption standard such as the Triple-DES symmetric key encryption algorithm or for use with another suitable symmetric key encryption algorithm). One illustrative symmetric key that may be used is a randomly-generated number. Such a randomly-generated number may be generated using operating system functions provided by the operating system on the sender's equipment 12 or may be generated using any other suitable random number generator. The sender may also compose or create or otherwise obtain a message to be sent to the receiver. The encryption software on the user's equipment (e.g., a Triple-DES symmetric key encryption engine and the symmetric key) may then be used to encrypt the message.

At step 28, the message key (e.g., the symmetric message key) may be combined with policy information that dictates the conditions under which the message is permitted to be opened. Some (or all) of the policy information may be obtained by the sender from outside sources. For example, if the receiver has a security clearance due to the receiver's status in an organization, information on this security clearance level may be provided to the sender at step 22. If desired, other policy information (or all of the policy information) may be generated by the sender. For example, the sender may impose certain date-based restrictions on when the message may be accessed or may impose security clearance (access rights) restrictions or recipient-identity restrictions on the message.

An example of policy information based on access rights is policy information that specifies that only users with security clearances of top secret may access the message. Another example of access-rights-based policy information involves the use of policy information to limit access to the message to only system administrators. Yet another example of access rights that may be assigned via the policy information involves a group or class of users such as "account holders," "paid-in-full subscribers," or "employees." These are merely illustrative examples of policy information that may be used to govern how the contents of the message may be accessed based on permission level or access rights. Any other suitable arrangements for using policy information to control message access based on access rights may be used if desired.

The policy information may include a date (e.g., a particular day and/or time of day, a particular year, month, etc.). This type of date-stamp information may be used to send messages into the future. For example, the policy information may include a date before which the message contents cannot be viewed. Date-stamp information may also be used to create an expiration date for a message. After the expiration date has passed, the message can no longer be accessed.

If desired, the policy information may specify a particular recipient who is allowed to access the message. If the message is being sent to multiple parties, the message may include a list of these receivers. By limiting access to particular receivers, the message is secure from interception by unwanted third parties, even if the date stamp and security clearance constraints of the policy information are satisfied.

Any one of these types of policy information may be combined with the message key at step 28 by itself, any two may be used in combination, all three may be used in combination, or any other suitable policy information may be combined with the message key (alone or in combination with access-rights-based, identity-based, or date-based policy information).

With one suitable arrangement, the message key and policy information are combined by concatenating the policy information and the message key. The concatenated message key and policy information may then be encrypted during step 28 using the single public key of the key management service (i.e., the key-management-service public key and using the public key algorithm associated with the public-key/private-key pair of the key management service (e.g., the RSA encryption algorithm). Encrypting the message key and policy information together during step 28 (i.e., encrypting the concatenated message key and policy information) helps to maintain the integrity of the message key as it is sent across communications network 14.

At step 30, the message that was encrypted with the message key at step 26 (e.g., the message encrypted using the symmetric key) and the message key and policy information that have been encrypted using the key management service's public key at step 28 are sent to the receiver. (If desired, the message-key-encrypted message and the public-key-encrypted message-key/policy-information may be sent as two separate transmissions.) Because only the key management service 16 has the private key needed to decrypt and access the public-key-encrypted message key and policy information, the message key is secure from attack. Moreover, when the message from the sender is sent to the receiver, only the sender has the message key (at least initially, before the receiver obtains the key), so the message encrypted using that message key is also secure from attack.

Illustrative steps involved in setting up and using the equipment of the receiver to receive and decrypt the message from the sender are shown in FIG. 3. At step 32, the receiver's email application or other software running on the receiver's equipment 12 may be used to receive the information that was sent by the sender at step 30 of FIG. 2. The information received from the sender includes the message-key-encrypted message and the public-key encrypted message key and public-key-encrypted policy information. The message that is encrypted using the message key may be retained by the receiver (e.g., the encrypted message may be stored on a local hard drive) for decryption once the receiver obtains an encrypted version of the message key.

The receiver's equipment may be set up to perform the functions needed to handle this incoming information from the sender and thereby access the message key and decrypt the message at any suitable time. For example, software for implementing these functions may be preinstalled on the receiver's equipment and distributed to the receiver when the receiver obtains this equipment. The receiver may also download and install appropriate stand-alone or plug-in software. If the receiver's equipment has not already been set up for these operations, the equipment may be set up at step 34. For example, appropriate software may be installed from a computer-readable medium such as a computer disk or memory chip or may be downloaded from a server over the Internet. Previously-installed software may also be activated.

At step 36, the receiver may interact with the key management server to obtain an unencrypted version of the message key. With one suitable approach, the receiver may forward the public-key-encrypted message key and policy information to the key management service. The key management service may use the public-key decryption algorithm associated with the public-key/private-key pair to decrypt the information forwarded by the receiver. For example, if the public key and private key were generated by the RSA algorithm, the key management service may use the RSA decryption algorithm and the private key to decrypt the public-key-encrypted message key and the public-key-encrypted policy information.

The receiver may provide authentication information to the key management server that the key management server may use to determine whether the receiver is authorized to access the message. For example, the receiver may provide the key management server with the receiver's email address, name, or other identity information so that the key management server can compare the receiver's identity to the identity of authorized personnel specified in the policy information. The key management service may use information on the receiver's access rights to determine whether the receiver is entitled to message access. The key management service may also use information on the current date (including the current time if desired) to determine whether the expiration date or activation date specified in the policy information will allow the message to be accessed.

Once the key management service is satisfied that the receiver is authorized to access the message contents, the key management service may provide the receiver with the decrypted version of the message key. For example, the receiver may be provided with the message key during step 36 using a secure communications channel. Any suitable technique may be used to ensure that the communications path between the key management service and the receiver is secure when the message key is being exchanged. For example, the key management service and receiver may use the secure sockets layer protocol to ensure that communications are secure. The receiver may also physically obtain the key from the key management service (e.g., via courier or mail on a computer disk). The receiver and may receive the message key from the key management service using secure email communications (e.g., using public key encryption techniques).

The key management service 16 preferably authenticates the receiver's identity before the decrypted message key is released to the receiver at step 36. Any suitable authentication technique may be used. For example, the receiver may communicate with the key management service over a trusted communications path (e.g., dedicated or trusted lines), the receiver may provide a letterhead or biometric information to the key management service. This information may be provided electronically (e.g., over a secure path), in person, using a trusted intermediary (e.g., a certificate authority), etc. Once the key management service 16 verifies the receiver's identity, the computing equipment 18 at the key management service may provide the decrypted version of the message key to the receiver at step 36.

Once the receiver has been provided with the message key at step 36, the receiver's equipment may use the installed decryption algorithm (e.g., a Triple-DES symmetric key decryption algorithm) to decrypt the stored message-key-encrypted message at step 38. The decryption algorithm may use the message key and the message-key-encrypted message as inputs and may produce a corresponding decrypted version of the message as an output. The decrypted message contents may then be accessed by the receiver. If desired, the decrypted message key may be retained by the receiver (and by the sender) to use in subsequent communications (e.g., for use with all messages exchanged on that day or other suitable time period). In a symmetric key system, the users may use the retained message keys for both encryption and decryption operations.

Illustrative steps involved in using key management service 16 during the operation of system 10 are shown in FIG. 4. At step 40, key management service 16 may obtain a public key and corresponding private key for use in encryption and decryption. Any suitable cryptographic algorithms may be used by the key management service for encryption and decryption. For example, the RSA cryptographic algorithm may be used. During step 40, a single public key and a single corresponding private key may be generated using computing equipment 18 (e.g., based on random numbers generated using the operating system installed on computing equipment 18).

At step 42, the public key that was generated or obtained at step 40 may be provided to the users in the system. For example, the public key may be made available over the communications network 14 using computing equipment 18 (e.g., a server) at key management service 16. The public key may be sent to users via email. If desired, the public key may be provided to users on demand (e.g., by downloading from a server, in the form of a message, or using any other suitable arrangement). The public key may be distributed as part of a downloadable or preinstalled software module or package. For example, the public key may be incorporated into an email application, web browser, or other communications or Internet application that is distributed with the user's personal computer or other user equipment 12 or that is downloaded (e.g., in the form of a plug-in or stand-alone package) at a later time. If desired, the public key may be distributed manually (e.g., by printed mail or by distributing a diskette or other computer-readable media to the user). These are merely illustrative examples. Any suitable technique may be used to provide the public key information to users 12.

Once the public key has been provided to a user (i.e., a sender) who desires to send an encrypted message to another user (i.e., a receiver) and once the sender has obtained a suitable message key, the sender may use the message key to encrypt the message for the receiver and may use the key management service's public key to encrypt the message key and to encrypt policy information that identifies how the message may be accessed. The message-key-encrypted message and the public-key-encrypted message-key/policy-information may then be sent to the receiver (step 30 of FIG. 2). The receiver may receive this information from the sender (step 32 of FIG. 3) and may forward the public-key-encrypted message key and policy information to the key management service (step 36 of FIG. 3).

At step 44 of FIG. 4, the key management service may receive the public-key-encrypted message key and public-key-encrypted policy information. This information may be received in the form of a request from the receiver to decrypt the message key. As part of this request (or in an ancillary transaction), the receiver may provide authentication information to the key management service that may be used to verify that the receiver is authorized to access the message. The key management service may use the same public-key cryptographic algorithm (e.g., the RSA algorithm) that was used to generate the public-key/private-key pair at step 40 and that was used by the sender to encrypt the message key and policy information at step 28 of FIG. 2 to decrypt the public-key-encrypted message key and public-key-encrypted policy information at step 46.

Once the decryption process has been completed, the key management service may, during step 46, use the policy information to determine whether the policy constraints have been satisfied. For example, if the policy information dictates that the message may only be accessed by a particular receiver, the key management service may authenticate the identity of the receiver and compare this authenticated identity to the identity of the authorized recipient specified in the policy information. Any suitable manual or automatic authentication technique may be used to verify the receiver's identity if desired. For example, the receiver may be asked to fax or mail a letter to the key management service on the receiver's official letterhead, which is examined for authenticity by personnel or automated equipment at the key management service. As another example, biometric identification techniques (e.g., fingerprint analysis, eye-scanning, handprint or voiceprint analysis, facial recognition methods, or in-person identification checks) may be used. When the authentication process involves electronic communications between the receiver and the key management service, the communications path between the receiver and the key management service should be secure. The communications path may be assumed to be secure if it is not available for use by untrusted parties. For example, the network between the key management service and the receiver may be a private line that is controlled by the key management service or another trusted authority. As another example, a secure channel may be supported using a secure sockets layer connection.

The policy information may specify that the message may only be accessed by receivers with certain access rights or during a specific time period. During step 46, the key management service may compare the expiration time and/or activation time information contained within the policy information to the current date. If the message has expired or the appropriate time for message retrieval has not yet occurred, the key management service may refrain from proceeding. If, however, the date constraints and other constraints such as clearance level (access rights) and specific receiver identity restrictions have been satisfied, the key management service may conclude that the policy constraints imposed by the policy information have been satisfied and receiver is properly authorized to access the contents of the message. The key management service may therefore provide the decrypted message key to the receiver at step 48. The message key may, for example, be provided to the receiver over network 14 using a secure communications path (e.g., using a secure sockets layer connection). If desired, the message key may be provided to the receiver by mail or courier (e.g., on a computer-readable medium such as a computer disk or memory chip). These are merely illustrative techniques for providing the decrypted message key to the receiver at step 48. Any suitable technique may be used if desired.

After the key management service provides the message key to the receiver at step 48, control loops back to step 44 as indicated by line 50, so that the key management service 16 may receive and process additional requests from the same receiver or from other receivers in system 10. After the key management service provides the decrypted message key to an authorized receiver, that receiver may use the message key to decrypt the encrypted message from the receiver (step 38 of FIG. 3).

With cryptographic schemes such as the approaches described in connection with FIGS. 1-4, the sender can obtain the message key and the public key of the key management service in advance of encrypting and sending the message and in advance of encrypting and sending the message key and policy information. The message key and single public key may be carried with the sender (e.g., on the sender's equipment 12 when the sender's equipment 12 is portable). It is not necessary to have access to each different possible receiver's public key, because there is generally only a single public key and because the message key may be generated locally by the sender. To decrypt the message, the receiver must interact with the key management service (to decrypt the message key), but the receiver can obtain the unencrypted version of the message key after the encrypted message has already been received. This arrangement allows the sender to be off-line (e.g., traveling in an airplane without Internet access) when the sender composes and encrypts a message for the receiver. Even if the sender's equipment is stolen; the encrypted message will be safe (provided that the message key is not retained in a publicly-accessible form by the sender or is otherwise kept secret), because only the key management service and authorized receivers have access to the public-key decryption capabilities of the key management service to decrypt the public-key-encrypted message key. Such a scenario would not generally be possible using a traditional public-key encryption scheme, because the composed message would remain unencrypted until the sender was able to obtain Internet access to look up the receiver's public key.

System 10 may have multiple key management services with different respective public-key/private-key pairs. A directory (e.g., a web-based directory in communication with network 14) may be used to host directory information regarding which users are associated with which key management services.

By using multiple key management services in system 10, some organizations (e.g., organizations with the greatest need for security) can guard their own private keys, without needing to trust third parties or other organizations or services. This may be important in situations in which secrecy is so important that it cannot be delegated easily (or at all) to others. Even if there are multiple key management services, the number of public-key/private-key pairs used by system 10 will be modest compared to the number of public keys (N) needed in a traditional public-key system with N users.

The user equipment and key management service equipment and other portions of the system may be based on hardware such as computers or other processor-based equipment. The methods for operating and using this hardware may be implemented by firmware and/or code ("software") that runs on the hardware. The hardware may include fixed and removable computer-readable storage media such as memory, disk drives, etc. on which the software for implementing the features of the system may be stored (permanently and during execution). The software may be used to configure the hardware of the user equipment and key management service's computing equipment and other portions of the system to perform the functions of the encryption schemes described in connection with FIGS. 1-4.

The foregoing is merely illustrative of the principles of this invention and various modifications can be made by those skilled in the art without departing from the scope and spirit of the invention.

What is claimed is:

1. A method for allowing a sender having user equipment to send a secure message to a receiver having user equipment over a communications network to which the user equipment of the sender is coupled and the user equipment of the receiver is coupled, wherein a key management service is coupled to the communications network that has an associated key-management-service public key and key-management-service private key, wherein the sender encrypts the message using a message key to produce a message-key-encrypted message, the method comprising:

at the sender, encrypting the message key and policy information using the key-management-service public key to generate a corresponding public-key-encrypted message key and public-key-encrypted policy information, wherein the policy information includes date-based constraints that restrict access to the message to a particular time;

providing the message-key-encrypted message, the public-key-encrypted message key, and the public-key-encrypted policy information that includes date-based constraints that restrict access to the message to a particular time to the receiver;

receiving the public-key-encrypted message key and public-key-encrypted policy information including the date-based constraints that restrict access to the message at the key management service from the receiver;

decrypting the encrypted policy information including the date-based constraints at the key management service using the key management service's private key;

determining, at the key management service, whether policy constraints imposed by the policy information including the date-based constraints that restrict access to the message have been satisfied;

decrypting the public-key-encrypted message key at the key management service using the key management service's private key; and providing the resulting unencrypted version of the message key to the receiver if the policy constraints including the date-based constraints that restrict access to the message have been satisfied for the receiver to use in decrypting the message-key-encrypted message.

2. The method defined in claim 1 further comprising using an RSA encryption algorithm to generate the key-management-service public key and the key-management-service private key.

3. The method defined in claim 1 wherein there is only a single public key and a single corresponding private key generated by the key management service, the method comprising using an RSA encryption algorithm at the key management service to generate the single public key and the single private key.

4. The method defined in claim 1 further comprising providing the sender with the key-management-service public key.

5. The method defined in claim 1 further comprising providing the sender with the key-management-service public key by distributing the key-management-service public key in software installed on the sender's equipment.

6. The method defined in claim 1, wherein the message key comprises a symmetric message key and wherein the sender uses symmetric key encryption to encrypt the message for the receiver using the symmetric message key and uses the key management service's public key and public key encryption to encrypt the symmetric message key to produce a public-key-encrypted symmetric message key, the method further comprising using an RSA algorithm at the key management service to decrypt the public-key-encrypted symmetric message key.

7. The method defined in claim 1 wherein the policy information includes the identity of the receiver, the method further comprising authenticating the identity of the receiver at the key management service to determine whether or not the policy constraints have been satisfied.

8. The method defined in claim 1 wherein the sender concatenates the policy information with the message key before encrypting the message key and policy information with the key-management-service public key.

9. The method defined in claim 1 wherein the policy information includes constraints based on receiver identity information and access rights, the method further comprising using the key management service to ensure that constraints based on the receiver identity information and access rights have been satisfied by the receiver before providing the receiver with the decrypted message key.

10. The method defined in claim 1 wherein the message key is a symmetric message key, wherein the sender encrypts the message using the symmetric message key according to the Triple-DES encryption standard, wherein the sender sends the encrypted message to the receiver using an email program, and wherein the policy information dictates that only a receiver of a certain clearance level may access the message, the method further comprising using an RSA algorithm to produce the public key and private key at the key management service.

11. The method defined in claim 1 further comprising:

at the sender, obtaining the key-management-service public key from the key management service by accessing a database at the key management service.

12. A method comprising:

providing a key management service having a key-management-service public key and key-management-service private key;

encrypting, at a sender, a message using a message key to produce a message-key-encrypted message;

encrypting, at the sender, the message key and policy information using the key-management-service public key to generate a corresponding public-key-encrypted message key and public-key-encrypted policy information, wherein the policy information includes date-based constraints that restrict access to the message to a particular time;

providing, to the receiver, the message-key-encrypted message, the public-key-encrypted message key, and the public-key-encrypted policy information that includes the date-based constraints that restrict access to the message;

receiving, at the key management service, the public-key-encrypted message key and the public-key-encrypted policy information that includes the date-based constraints that restrict access to the message from the receiver;

decrypting, at the key management service, the encrypted policy information that includes the date-based constraints that restrict access to the message using the key management service's private key;

decrypting, at the key management service, the public-key-encrypted message key using the key management service's private key; and if policy constraints associated with the policy information including the date-based constraints that restrict access to the message have been satisfied, providing the resulting unencrypted version of the message key to the receiver to use in decrypting the message-key-encrypted message.

13. The method defined in claim 12 further comprising using an RSA encryption algorithm to generate the key-management-service public key and the key-management-service private key.

14. The method defined in claim 12 wherein there is only a single public key and a single corresponding private key generated by the key management service, the method comprising using an RSA encryption algorithm at the key management service to generate the single public key and the single private key.

15. The method defined in claim 12 further comprising providing the sender with the key-management-service public key.

16. The method defined in claim 12 further comprising providing the sender with the key-management-service public key by distributing the key-management-service public key in software installed on the sender's equipment.

17. The method defined in claim 12, wherein the message key comprises a symmetric message key and wherein the sender uses symmetric key encryption to encrypt the message for the receiver using the symmetric message key and uses the key management service's public key and public key encryption to encrypt the symmetric message key to produce a public-key-encrypted symmetric message key, the method further comprising using an RSA algorithm at the key management service to decrypt the public-key-encrypted symmetric message key.

18. The method defined in claim 12 wherein the policy information includes the identity of the receiver, the method further comprising authenticating the identity of the receiver at the key management service to determine whether or not the policy constraints have been satisfied.

19. The method defined in claim 12 wherein the sender concatenates the policy information that includes the date-based constraints that restrict access to the message with the message key before encrypting the message key and policy information with the key-management-service public key, the method further comprising using the key management service to consider whether the date-based constraints specified by the policy information have been satisfied.

20. The method defined in claim 12 wherein the policy information includes constraints based on receiver identity information and access rights, the method further comprising using the key management service to ensure that the constraints based on receiver identity information and access rights have been satisfied by the receiver before providing the receiver with the decrypted message key.

21. The method defined in claim 12 wherein the message key is a symmetric message key, wherein the sender encrypts the message using the symmetric message key according to the Triple-DES encryption standard, wherein the sender sends the encrypted message to the receiver using an email program, and wherein the policy information that includes the date-based constraints dictates that only a receiver of a certain clearance level may access the message, the method further comprising using an RSA algorithm to produce the public key and private key at the key management service.

22. The method defined in claim 12 further comprising:
    at the sender, obtaining the key-management-service public key from the key management service by accessing a database at the key management service.

\* \* \* \* \*